(12) United States Patent
Garfinkle et al.

(10) Patent No.: US 9,940,345 B2
(45) Date of Patent: *Apr. 10, 2018

(54) SOFTWARE METHOD FOR DATA STORAGE AND RETRIEVAL

(76) Inventors: Norton Garfinkle, Boca Raton, FL (US); Richard Garfinkle, Chicago, IL (US)

( * ) Notice: Subject to any disclaimer, the term of this patent is extended or adjusted under 35 U.S.C. 154(b) by 331 days.

This patent is subject to a terminal disclaimer.

(21) Appl. No.: 12/007,444

(22) Filed: Jan. 10, 2008

(65) Prior Publication Data

US 2008/0243790 A1    Oct. 2, 2008

Related U.S. Application Data

(60) Provisional application No. 60/879,526, filed on Jan. 10, 2007.

(51) Int. Cl.
G06F 7/00 (2006.01)
G06F 17/30 (2006.01)

(52) U.S. Cl.
CPC ............... *G06F 17/30333* (2013.01)

(58) Field of Classification Search
None
See application file for complete search history.

(56) References Cited

U.S. PATENT DOCUMENTS

| | | | |
|---|---|---|---|
| 5,359,724 A * | 10/1994 | Earle | |
| 5,652,873 A | 7/1997 | Fecteau et al. | |
| 5,758,353 A | 5/1998 | Preeston | |
| 5,799,299 A | 8/1998 | Fujiwara | |
| 5,819,280 A | 10/1998 | Nagai | |
| 6,134,542 A | 10/2000 | Rustige | |
| 6,236,988 B1 | 5/2001 | Aldred | |
| 6,330,572 B1 | 12/2001 | Sitka | |
| 6,405,207 B1 | 6/2002 | Petculescu et al. | |
| 6,470,344 B1 | 10/2002 | Kothuri et al. | |
| 6,505,205 B1 * | 1/2003 | Kothuri et al. | |
| 6,507,846 B1 | 1/2003 | Consens | |

(Continued)

FOREIGN PATENT DOCUMENTS

WO    90/00283    1/1990
WO    95/02222    1/1995

OTHER PUBLICATIONS

David M. Mount et al., "A dynamic data structure for approximate range searching", SCG, Jun. 2010, pp. 247-256.

(Continued)

*Primary Examiner* — Tuan A Pham
(74) *Attorney, Agent, or Firm* — Sabety + associates, PLLC; Ted Sabety

(57) ABSTRACT

This invention discloses a novel method for storing data in virtual multidimensional blocks and accessing and retrieving desired information from these blocks. Specific items of data whose characteristics fall within the range of a specified block are stored within that block. Blocks with smaller ranges are nested within larger blocks with the same characteristics. This invention's search method involves checking the specific range of a search query against the largest relevant block range, and then successively checking smaller and smaller range blocks that contain the desired data. This method provides greater speed and accuracy than conventional database linear storage and record by record search methods.

3 Claims, 3 Drawing Sheets

(56) References Cited

U.S. PATENT DOCUMENTS

| | | | |
|---|---|---|---|
| 6,687,688 B1* | 2/2004 | Fujihara et al. | |
| 6,714,979 B1 | 3/2004 | Brandt et al. | |
| 6,745,115 B1 | 6/2004 | Chen et al. | |
| 6,772,274 B1 | 8/2004 | Estakhri | |
| 7,020,651 B2 | 3/2006 | Ripley | |
| 7,233,942 B2* | 6/2007 | Nye | |
| 7,249,118 B2* | 7/2007 | Sandler et al. | |
| 7,373,473 B2* | 5/2008 | Bukowski et al. | 711/170 |
| 7,739,239 B1 | 6/2010 | Cormie et al. | |
| 2002/0191605 A1* | 12/2002 | Lunteren et al. | 370/389 |
| 2003/0088576 A1* | 5/2003 | Hattori et al. | 707/103 R |
| 2003/0126145 A1 | 7/2003 | Sundstrom et al. | |
| 2003/0204513 A1* | 10/2003 | Bumbulis | 707/100 |
| 2003/0204537 A1 | 10/2003 | Liang et al. | |
| 2003/0227931 A1* | 12/2003 | Chen et al. | 370/408 |
| 2004/0036716 A1* | 2/2004 | Jordahl | 345/713 |
| 2004/0064463 A1 | 4/2004 | Rao et al. | |
| 2005/0050060 A1 | 3/2005 | Damm et al. | |
| 2005/0071349 A1 | 3/2005 | Jordan et al. | |
| 2005/0114289 A1* | 5/2005 | Fair | 707/1 |
| 2005/0114370 A1* | 5/2005 | Lewak et al. | 707/100 |
| 2005/0163122 A1* | 7/2005 | Sahni et al. | 370/392 |
| 2005/0171960 A1* | 8/2005 | Lomet | 707/100 |
| 2005/0203930 A1* | 9/2005 | Bukowski et al. | 707/100 |
| 2005/0234951 A1* | 10/2005 | MacCormick | 707/101 |
| 2006/0004792 A1 | 1/2006 | Lyle et al. | |
| 2006/0106762 A1* | 5/2006 | Caracas et al. | 707/3 |
| 2006/0106843 A1* | 5/2006 | Middelfart et al. | 707/101 |
| 2006/0136380 A1 | 6/2006 | Purcell | |
| 2006/0161579 A1 | 7/2006 | Venguerov | |
| 2006/0248054 A1* | 11/2006 | Kirshenbaum et al. | 707/3 |
| 2006/0262145 A1* | 11/2006 | Zhang et al. | 345/661 |
| 2007/0027937 A1* | 2/2007 | McGrattan et al. | 707/204 |
| 2007/0130032 A1* | 6/2007 | Nelson et al. | 705/30 |
| 2007/0185863 A1* | 8/2007 | Budzik et al. | 707/5 |
| 2007/0248259 A1 | 10/2007 | Liu | |
| 2008/0016035 A1* | 1/2008 | Middelfart | 707/3 |

OTHER PUBLICATIONS

CA Datacom® Task Storage Options, User Key ECSA and Data Space, Sep. 19, 2007, 19 pages.

\* cited by examiner

SOFTWARE METHOD FOR DATA STORAGE AND RETRIEVAL

CROSS REFERENCE TO RELATED APPLICATION

This application claims the benefit of U.S. Provisional Application No. 60/879,526, filed Jan. 10, 2007, entitled Software Method for Data Storage and Retrieval.

FIELD OF THE INVENTION

This invention relates to a method and system for the storage of data on a computer database and for the retrieval of that data.

BACKGROUND OF THE INVENTION

Standard database methodology consists of having each item of stored data associated with a designated set of characteristics. Each characteristic is assigned specific values for each piece of data. Each item of data is usually referred to as a "record" and the characteristics are called the "fields" of that record. Searches of such databases are typically done by specifying desired values or ranges of values for a plurality of such fields. Each individual record in the database is then checked against the specified values and those records that fit the requested values are identified and retrieved as successful results of the search. Since each record in the database needs to be checked, such a search can be slow and demands substantial computing resources if the database is large. Various intelligent search methods have been employed to try to speed this search process up, but the fundamental difficulty lies in the system of storing and examining and accessing each individual record in the database. Improved storage and retrieval methods are needed including methods that do not require the examination of each individual record in the database.

There have been several attempts at such new methods. For example the patent to Rustige, U.S. Pat. No. 6,134,542 addresses the problem of searching multiple databases with a single query. Rustige's method involves the creation of a separate database containing references to characteristics of the records of these databases. According to the Rustige disclosure, references are keyed by specific values for those characteristics, not ranges. The patent to Aldred, U.S. Pat. No. 6,236,988 uses a branching tree structure to organize some of the data in a database. This structure creates a hierarchy of objects and a table for finding particular objects. This technique allows for faster retrieval of an object and its descendants, but still uses fixed value searching not range searching. The patent to Fujihara, U.S. Pat. No. 6,687,688 discloses a method using multi-dimensional coordinate data. The method therein uses labels based on coordinate data to access and retrieve desired data. This method still requires a record by record search of the whole database for matching query characteristics to the labels.

SUMMARY OF THE INVENTION

The present invention is directed at a storage method that stores data in blocks in a database, the blocks representing all the values that fall within specified predetermined ranges for specified characteristics. All data items in the blocks are predesignated as members of each relevant dataspace block. These designations can be created automatically by preexamination of each data item upon first entry into the database or at any subsequent time when new characteristics are established or when data values are changed within a given data item. These designations are referred to as metadata.

When a search is conducted on the database, the range of the search query is automatically compared with the ranges of each relevant preestablished block's metadata. If the search range contains the relevant metadata block ranges, the software pulls out all the data items in the relevant block avoiding the task of checking each individual data item within the block. If the search range overlaps the block range, the software then uses the same search procedure to check subblocks contained in that block and then identifies only the data items in that subblock that match the query. If the search query has a further specification, then the relatively small number of individual items of the last delineated block or subblock can be examined using conventional data analysis methods to extract the data items that fit the specific characteristics of the query.

While this last part of the search would commonly use conventional record by record search methods, these methods would be used on a much more restricted dataset than a full scale conventional search of every single record in a defined database. Thus the dataspace method saves search time and computer power.

DETAILED DESCRIPTION

This invention relates to a storage method that stores data in blocks, representing all the values that fall within specified ranges for specified characteristics. The data items can be locally entered, obtained from preexisting individual data sources such as local databases, or drawn from a wider internet search. The data entries may be entered directly from these sources or data items calculated from them may be entered. All data items are pre-designated as members of each relevant dataspace block, the block being a data structure abstraction that further organizes the member data items. Each block has member data items and metadata associated with the block itself. These designations can be created automatically by examination of each data item upon first entry into the database or at any subsequent time when new classifications are established or when data values are changed within a given data item. When a search is conducted the range of the search query is automatically compared in turn with the ranges of each relevant pre-established block's metadata. If the search range contains the relevant metadata block ranges, the software pulls out all the data items in the relevant block avoiding the task of checking each individual data item within the block. If the search range overlaps the block range, the software then uses the same search procedure to check subblocks contained in that block and then identifies only the data items in that subblock that match the query. If the search query has a further specification, then the relatively small number of individual items of the last delineated block or subblock can be examined using conventional data analysis methods to extract the data items that fit the specific characteristics of the query.

While this last part of the search would commonly use conventional record by record search methods, these methods would be used on a much more restricted dataset than a full scale conventional search of every single record in a complete database. Thus the dataspace method saves search time and computer power.

Figure 1:
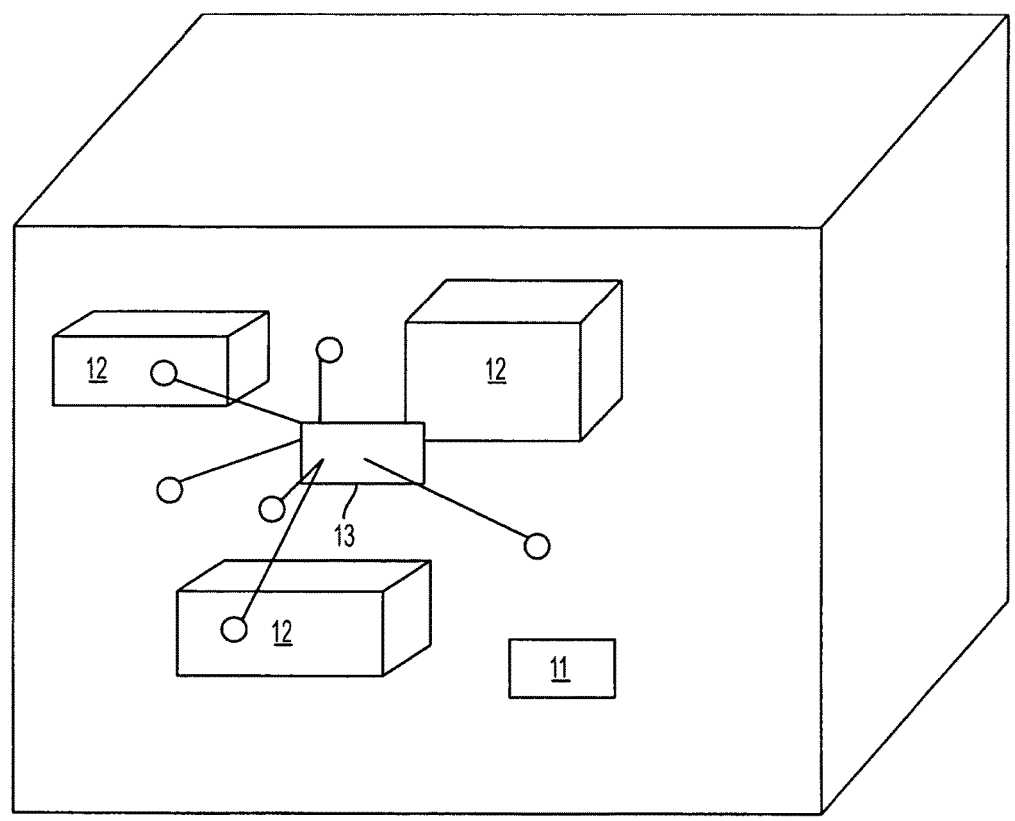
FIG. 1 is a schematic representation of the structure of the data in a dataspace including sub-blocks according to the invention.

Now referring to FIG. 1 a three dimensional abstraction of a typical dataspace residing in a memory is illustrated. The depicted block 11 represents a dataspace block, the smaller blocks 12 are subblocks inside it. The circles 13 represent individual pieces of data.

Figure 2:
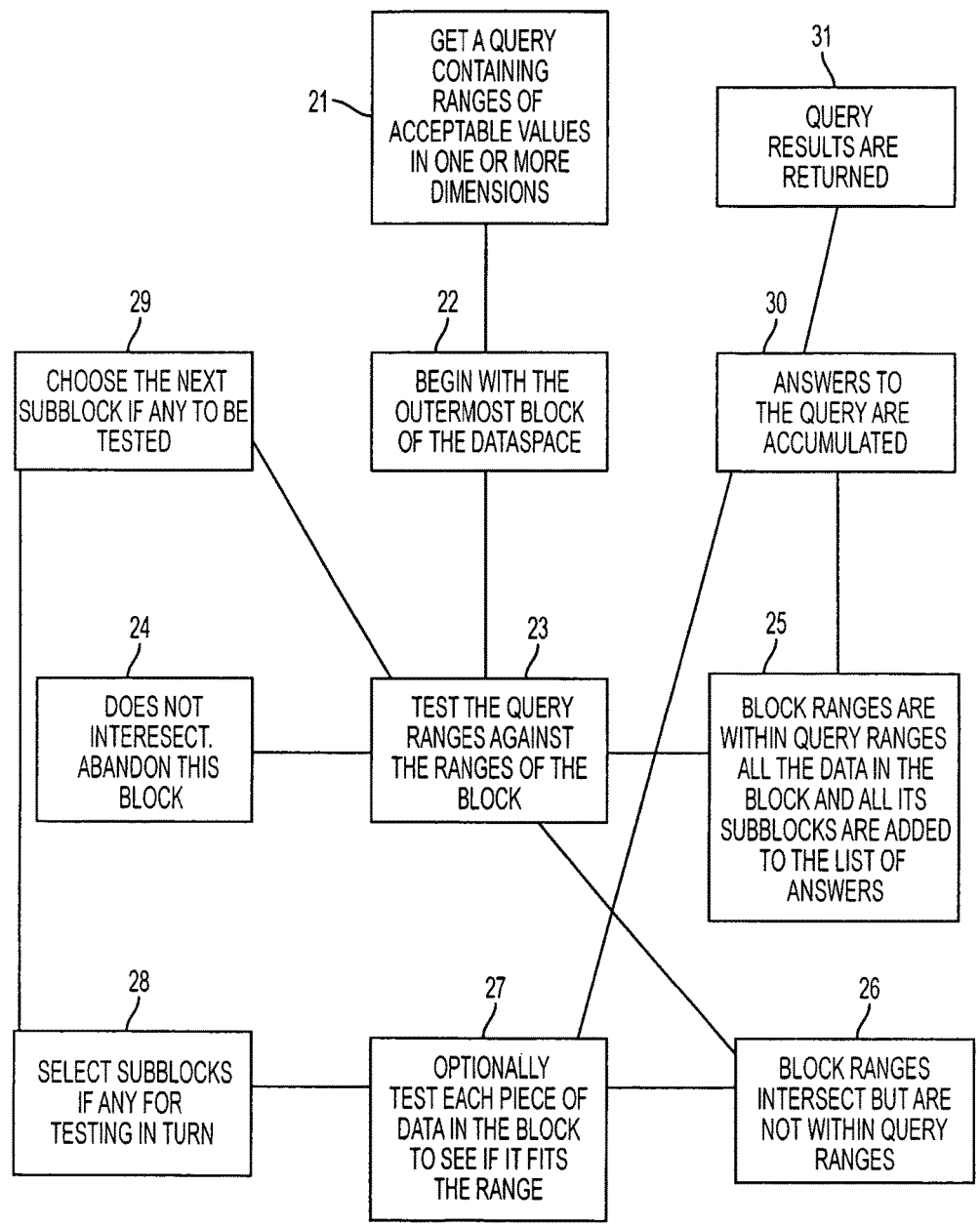
FIG. 2 is a flow chart illustrating a method of the invention with respect to a specific embodiment.

Referring now to FIG. 2, this flowchart represents the dataspace search procedure. Beginning at step 21, a query is created containing desired ranges of values for the searched data. Next, at step 22, the largest block of the entire dataspace is selected. At step 23, the block's metadata is compared to the query range to determine whether the block's metadata fits the query.

As shown at step 24, if the block's ranges do not intersect the query's ranges, that block is abandoned and the searching is stopped. Neither it nor its subblocks will be checked again in this query.

Referring to step 25, if the block's ranges lie within the query's ranges, then all the data contained in the block and its subblocks will be added to the store of accumulated answers.

Proceeding to step 26. If the block's ranges and the query's ranges intersect, then the block's contents are checked. The individual data elements of an intersecting block can be optionally checked against the ranges. This procedure which is a standard one for relational databases only occurs optionally and only under this specific narrow circumstance as opposed to happening in each case for each data element. Only the data stored in the block itself not in its subblocks are checked at this point. Any successfully checked data are added to the store.

In step 28, the subblocks of the present block are selected one at a time, going through the list specified in the block's metadata.

In step 29, once a block is picked it is fed back into the search procedure.

In step 30, answers accumulate into a query response.

In step 31, once the last block has been checked the accumulated responses are returned to the query source as is standard in database usage.

A First Specific Embodiment

A first contemplated embodiment of this invention is a dataspace management software program on a computer or other microprocessor device that does the same work as standard relational dataspace management programs.

A dataspace management software system for a pharmaceutical company is an example of this preferred embodiment. The need for continual and frequent access to and analysis of the data in the pharmaceutical company database substantiates the need for a system that provides fast access and an easy ability to update the data and data characteristics.

In this example, one of the areas of the pharmaceutical company's database system would address the need to store, retrieve and access information on each medical condition and each drug of interest to the company. This data content is referred to as company's drug dataspace. The drug dataspace would preferably consist of a plurality of dimensions used to describe a drug, including for example, its approved use for specific medical ailments, its patent status, its alternative approved therapy and the patent position of such alternative therapies as well as other relevant data. Some data dimensions may apply to any manufactured product, including, for example: the manufacturing cost per unit, recommended sales price, total sales volume, average yearly sales volume, current and potential demand for the product. In connection with the example, drug-specific data range, it might include the date of patent (or patents), groupings of conditions the drug can treat, groupings of side effects. For example, all drugs that are used for heart conditions or that have heart side effects may be identified as in a Coronary Range; within that range would be subranges for the various kinds of coronary effects possible (for example, a drug to treat arrhythmia could be in the arrhythmia subrange for Treated Conditions. A drug that had the side effect of causing arrhythmia may be in the same subrange in the Side Effect dimension). Within these subranges could be efficacy and side effect risk ranges. A drug with a reported 95% efficacy against Arrhythmia would be in a 90-100% efficacy subrange within the Arrhythmia Subrange within the Coronary Range of the Treatment Dimension. One with a 22% chance of causing Arrhythmia would be in the 20-30% risk category within the Arrhythmia Subrange within the Coronary Range of the Side Effect Dimension.

In this embodiment the path of a query for 95% efficacy arrhythmia drugs with no more than 2% risk of side effect may be traced.

Now referring to FIG. 2 which describes the central search routines of this invention applies to the embodiment relating to drug database discussed herein. The search begins with the creation of a query that specifies the ranges of acceptable data items: Treated Conditions: Arrhythmia; Efficacy: 95-100%; Side Effect Risk 0-2%.

In this example, the outermost block of the dataspace is selected for analysis. Its ranges are checked against the above query.

Since this outermost block does indeed have dimensions for Treated Conditions, Efficacy, and Side Effect Risk, they are then checked. The outermost block's ranges would be Treated Conditions: All; Efficacy: 0-100%; Side Effect Risk: 0-100%. The block's ranges intersect but are not contained within the ranges of the query.

The subblocks of this block would then be checked. Those subblocks would be organized mostly by Treated Conditions, so the Coronary Block, Efficacy: 0-100%, Side Effect Risk: 0-100% would be the only subblock of the outermost block selected for further checking. This subblock would be divided into a plurality of additional subblocks: among them would be those that had Treated Condition Arrhythmia; Efficacy: 90-100%; Side Effect Risk 0-5%. None of the other subblocks would meet the criteria so the search would address this subblock and only this subblock.

This subblock's ranges do not fit the query criteria exactly. Its Efficacy Range and its Side Effect Risk Range are still too broad. The individual data item contents of this subblock would then be checked using a conventional item by item analysis. Those that had Efficacy of 95%-100% and side effect risk of 0%-2% would be identified as successful results. These successful results would be sent back as query answers.

Utilizing this rapid procedure the following blocks and subblocks had their metadata checked:

Outermost Block.

Subblocks of that based on Condition.

Subblocks of the Coronary Block based on Condition, Efficacy, and Side Effect.

Only one of all these subblocks (the one with: Condition: Arrhythmia; Efficacy: 90-100%; Side Effect Risk 0-5%) would have been checked item by item for exact query matches.

The dataspace dimensions and data item information are not permanently fixed. When new data, or a new dimension or new subrange is added, the dataspace can rapidly reconfigure itself.

The user of the invention would, in the normal course, have other data maintenance areas of interest. The user could choose to incorporate the data related to all of its areas of interest into a single overarching dataspace in order to facilitate queries that relate to more than one broad area, or have dataspaces covering separate areas because smaller spaces make for faster searches since there are fewer blocks to check.

Second Embodiment

A second embodiment consists of embedding the dataspace software routines of this invention in software systems that are used to manage specific content areas: for example, a preexisting general purpose weather service program. In this embodiment, the dataspace system could be applied by dividing the world into regions and subregions as dataspace blocks using longitude and latitude as range dimensions. This dataspace would serve as storage of information for weather modeling and be used for weather prediction and calculation as opposed to database querying.

In the above preferred embodiments a dataspace block is a data structure containing at least the following three components:
1. A list of data entries (possibly empty).
2. A list of subblocks (possibly empty).
3. Metadata consisting of a list of ranges. Each range is associated with a specific characteristic of the data entries, and specifies what range values each data entry can have for that characteristic in order to qualify to be in that block.

A data element that is a member of the data list in a block or a data list in any of that block's subblocks is said to be "inside" that block. Similarly a block that belongs to the subblock list of a block or a subblock list of any of its subblocks is said to be "inside" that block.

Because the subblocks of a block are themselves dataspace blocks they can in turn contain their own subblocks. Thus a block hierarchy is created. Note: a single block can be a subblock of more than one block thus the hierarchy structure need not be a simple tree diagram. Each standard dataspace has one or more top blocks.

The Metadata of each block is a list of ranges. Each range is associated with a characteristic of the data entries. Characteristics can be the equivalent of fields in a standard relational database, they can also be XML Elements or Attributes, they can be calculated values (such as the sum of two other characteristics or the width of an image), or any other unit of information computationally discernable from the data entry. The range specifies what values of the characteristic can be found for the data entries inside the block. The important theoretical concept is that any kind of data that can be given an ordering of any kind can be used as a characteristic for ranges.

The simplest kind of range is numeric. This would be used for characteristics that have a useful number value. For example, in a dataspace of weather data, temperature would be such a characteristic. A Block might have a temperature range of 0-50 degrees in its metadata and it might contain subblocks that divide up this temperature range: one subblock having a range of 0-10, another 10-20, another 20-30, another 30-40, and the last 40-50.

The next simplest kind of range is lexical where the characteristic represents a string of characters. Lexical ranges would commonly be alphabetic in ordering although other kinds of order could be programmed in instead. A dictionary could be made using such an alphabetic dataspace. In such a case the data entries would have 'Word' as one of their characteristics. One block might have 'B' as its lexical and it would match any word whose first letter is 'B'. This block might have 'Ba-Bd' as a subblock and 'Be-Bh' as another and so on.

Another kind of range would be a disjunctive list range. A data entry would belong to this characteristic if the appropriate characteristic contained any word on the list. For example, in a dataspace whose entries were web pages on economic subject matter, one might make a range for the body of the page using a wordlist containing 'tax', 'revenue', 'spending' and other such words. Any web page that had any of those words would belong to the block. In this case, subblocks would have smaller lists in the ranges than the block that contains them.

One could also have a conjunctive list range in which a data entry would have to match all the words in the list rather than any of them. In this case subblocks have longer lists in their ranges (for example a block with a range list of 'tax' could have a subblock with a list of 'tax', 'income', and 'federal').

The above two kinds of blocks are very useful in dataspaces that serve to hold the results of web searches.

A range can have the value: ALL. An all range contains any entry. Ranges can also be ALL below or ALL above. So a numerical range that goes from ALL to 30 could be any number less than 30, and one that goes from 5.6 to ALL would fit any number greater than 5.6.

This should show that any kind of data that can be extracted and used in comparisons can serve as the characteristic and values of a range.

The metadata of a block typically has one range for each characteristic used in the dataspace. For example, the metadata for blocks in a weather dataspace could have a temperature range, a maximum wind speed range, a precipitation range, (all of these would be numeric), a region range (that would be a disjunctive list for what states the block covered) and possibly others.

Metadata in blocks can be created in several ways.
1. The metadata can be pre-set before data is entered. For example, if a scientific test needs to classify outcomes based on specific groupings then the ranges for those outcomes would be precoded into blocks and then the data sorted into appropriate blocks. The standard sorting procedure is to check the top block and see if the data fits in that block. If it does then each subblock is checked to see if it fits there. This process continues recursively until the lowest block or blocks the ranges of which contain the characteristic values of the data entry are found. The data entry is then placed in the data lists of any such lowest blocks.
2. The metadata can be calculated based on the data. For example, if one wanted to create blocks representing the statistical results of a study, one might calculate the mean and standard deviation using ordinary statistical methods and then create blocks representing, 1 standard deviation from the mean, 2 standard deviations, etc. The data could then be sorted into the blocks using the method above.
3. The metadata can be generated by partitioning a previously created block into subblocks. In this case one might want to divide up an overly large block into easier to search subblocks by dividing up one or more of the ranges in the block's metadata to create the metadata in the subblocks. The process of partitioning involves making new blocks with the broken up ranges then adding them to the block list of the block being partitioned, then redistributing the data list of the block into these new subblocks. For example, in a phone book dataspace containing the phone numbers and addresses for everyone in New York State, one might start out with a county by county dataspace. Counties of small population would not need subdivision since they are small enough for easy search, but New York County would need to likely be broken up into smaller areas (such as 10 block zones) then any of these that had too high a population could in turn be broken up into single block zones.

The process whereby characteristics of particular data entries are determined (from which it is determined which block the data belongs to) depends on the format of the data. If the data are in the form of relational database records then standard querying can find any desired field's value. Similarly if the data are in the form of XML documents, then standard tree-node search processes can be used to get the value of any element or attribute. In a standard computing environment anything stored as a data structure or object in an object oriented programming language can have its components queried using standard methods in those languages. For other less easily accessed kinds of data, more sophisticated methods might be necessary (for example, extracting information from sound and image files can be done using the sophisticated processes of those specialized areas of programming). All that is necessary in any of these cases is to program the data extraction method into the dataspace so it can access the information it needs to determine the values of each characteristic. If the process of determining the data characteristics is costly in time and/or processing power, the data entry may retain the characteristic values in memory for faster comparison during queries.

Adding a new data entry to the data space works a follows:

the first step is to determined its characteristics as discussed above. One of two distinct procedures can be used to add the data entry to the dataspace depending on whether one has a specific block destination in mind for the new data or whether one simply seeks to place it in any block that it would fit in. The first is followed if one wishes to place the data into a prechosen block, the second if one wishes to find those blocks in the dataspace that the data entry would fit inside.

Case 1. The data entry is simply added to the data list of the block, then the data entry's characteristics are compared to the ranges of the block's metadata. If the data entry's characteristics fall outside the range then the range can be expanded to include the new characteristics. If the ranges of a block have been expanded the ranges of any blocks containing that block will also be checked to see if they have to expand to fit the new ranges. If the containing block's ranges change, any blocks containing it can then also be changed to fit if necessary and so on up the hierarchy. For example, in a dataspace of the population of regions, it may be desired to have fixed blocks for each region, but to have characteristics such as age and income ranges in the metadata of those blocks. If a new person moved into a town the data entry for that person would be added to the block representing the town. That person's age and income would be compared to the age and income ranges for the town's block. If the age range had been 0-85 and the income range $0.00-$200,000.00 and this person was 93 years old and made $1,500,000.00 per year the ranges on the block would change to 0-93 for age and $0.0-$1,500,000.00 for income.

The block for the state containing the block for the town would then be checked against these new ranges to see if they need to be expanded. Note: if adding a number of data entries in this way, it can be of computational advantage to defer expansion of the ranges until all of the data entries have been added. In this case, the data entries are added and then the entire new data list is swept through to determine the block's ranges, only after this would the ranges for containing blocks be redetermined.

Case 2. In this case a quick search is conducted to find the lowest block or blocks (that is the block or blocks farthest along in the hierarchy) that this data entry belongs in. The procedure is similar to that of a query. Top block is selected, its subblock list is checked one block at a time to see if the data entry fits inside the metadata of that block (that is if its characteristics lie within all the ranges of the block's metadata). If it does not fit into any of the subblocks, the data entry is placed in the top block. If it fits in to a block that block's subblocks are themselves checked to see if it fits into them. The data entry is added to the data lists of any blocks that contain the data entry but do not have any subblocks that contain the data entry.

Similar processes to the above can be employed if a new block needs to be added to the dataspace.

If it is necessary to add a new subblock to those subblocks contained in a predetermined block (such as adding a town's block to the subblocks of a state's block) then a process like Case 1 above is followed: The new subblock is added to the subblock list of the old block and the ranges of the old block are expanded if necessary to fit the ranges of the new block. If a set of blocks are being added this expansion can be deferred until all have been added. After the block's metadata has been recalculated any blocks containing that block can also be expanded if necessary and so on up the hierarchy.

If the new block simply needs to find its place in the hierarchy then a process similar to but more complicated than case 2 can be followed. In this case blocks are checked to see not only if they contain the new block completely, but, if they are contained in the new block. The testing is as follows.

If the new block contains the old block then the old block is removed from the block list of the block it belongs to and is added to the block list of the new block. If the old block contains the new block then the new block is checked against the subblocks of that new block to see if it is contained within any of them or contains any of them. If no subblock of the old block contains the new block then the new block is added to the subblock list of the old block. If a subblock of the old block does contain the new block then this procedure is carried out again using this subblock as the old block.

For example, suppose one had a dataspace that had blocks for the countries of the world and within those blocks, subblocks for all the major cities. If one later on decided that it would be good to add regions of the countries as an intermediate block level then a set of new subblocks would need to be added. In the original form of the dataspace, the blocks for Seattle and Tacoma would be sub blocks of the block for the United States, when the new regional blocks were added, the block for Washington State would be found to be a subblock of the United States, but it would also be found that Seattle and Tacoma lay within the block for Washington State. These two subblocks would be removed from the block list of the United States and added to the block list of Washington State which would in turn be added to the block list for the United States.

The dataspace system as described herein has advantages over standard relational databases in that it provides faster determination of which data entries fit a query. The faster access comes from the ability to test the metadata of a block quickly against the query of the search. The test uses the ranges of the metadata and sees whether the ranges specified in the query are disjoint from those ranges, contain those ranges, or intersect those ranges. A block whose ranges are disjoint will contain no data entries that fit the query. A block whose ranges are contained within the ranges of the query has all its data entries (and the data entries of all its subblocks) fitting the terms of a query. A block whose ranges intersect but are not fully contained in the ranges of the query needs to have its subblocks checked against the query and then have its individual data entries tested against the query by examining the specific content of each data entry. Because this is the only circumstance in which individual entries are examined in a dataspace query the number of individual data item tests is minimized. This is a great reduction in number and complexity of tests compared to standard record by record database query methods.

Dataspaces are also easy to update since whenever a new data entry is added each block it will belong to can be determined by identifying and specifying the relevant data characteristics of the entry. They can then be tested against the blocks in the hierarchy to find the appropriate blocks for the new data entry.

It is also possible to introduce new characteristics and to change the metadata of one or more pre-established blocks by adding, removing, or modifying the ranges. Added ranges could involve the addition of previously unexamined characteristics. In this circumstance the data entries would be automatically examined, specified, and distributed through the newly reformed block hierarchy.

The invention thus includes a method for storing and accessing related data comprising software routines procedures or functions which can be used as a stand alone system or can be embedded in a system with other software routines and procedures that are used to perform other functions. Data are stored in identifiable data blocks, each one of a plurality of such dataspace blocks is characterized by metadata comprising a specified range of predetermined characteristics.

It is also contemplated an embodiment wherein multiple hierarchies of dataspace blocks are established by identifying subblocks of larger blocks with dimensions that are the same as those of the larger block, but one or more of their ranges are smaller than the ranges specified in the larger block.

In addition, an embodiment includes additional routines and procedures to acquire data, create new blocks, remove old blocks, and alter the characteristics of individual blocks, by changing ranges, changing the dimensions of the block, changing the contents of blocks, splitting up or conjoining dataspaces or any combination thereof from existing database structures.

The invention also includes an embodiment where additional routines and procedures to acquire data, create new blocks, remove old blocks, and alter the characteristics of individual blocks, by changing ranges, changing the dimensions of the block, changing the contents of blocks, splitting up or conjoining dataspaces or any combination thereof from existing databases.

The invention also includes an embodiment where additional routines and procedures to search a plurality of dataspaces to find data that fall within given ranges of specified characteristics.

The invention also includes an embodiment where additional routines and procedures to search a plurality of dataspaces to find data that falls within given ranges of specified characteristics.

The invention also includes an embodiment where additional routines and procedures to search a plurality of dataspaces to find data that falls within given ranges of specified characteristics.

The invention also includes an embodiment where with additional routines and procedures to search a plurality of dataspaces to find data that falls within given ranges of specified characteristics.

The invention also includes an embodiment where additional routines and procedures to enable the dataspace searches to be combined with relational database storage and techniques to enable a) the storage of conventional databases and database records within dataspace blocks.

b) the storage of dataspace blocks as records within conventional databases.

c) the use of database search languages so that a single query can be employed on dataspace blocks and conventional database records.

The invention also includes an embodiment where additional routines and procedures to enable the dataspace searches to be combined with relational database storage and techniques to enable a) the storage of conventional databases and database records within dataspace blocks.

b) the storage of dataspace blocks as records within conventional databases.

c) the use of database search languages so that a single query can be employed on dataspace blocks and conventional database records.

The invention also includes an embodiment where additional routines and procedures to enable permit the dataspace searches to be combined with relational database storage and techniques to enable a) the storage of conventional databases and database records within dataspace blocks.

b) the storage of dataspace blocks as records within conventional databases.

c) the use of database search languages so that a single query can be employed on dataspace blocks and conventional database records.

The invention also includes an embodiment where additional routines and procedures to enable the dataspace searches to be combined with relational database storage and techniques to enable a) the storage of conventional databases and database records within dataspace blocks.

b) the storage of dataspace blocks as records within conventional databases.

c) the use of database search languages so that a single query can be employed on dataspace blocks and conventional database records.

Figure 3:
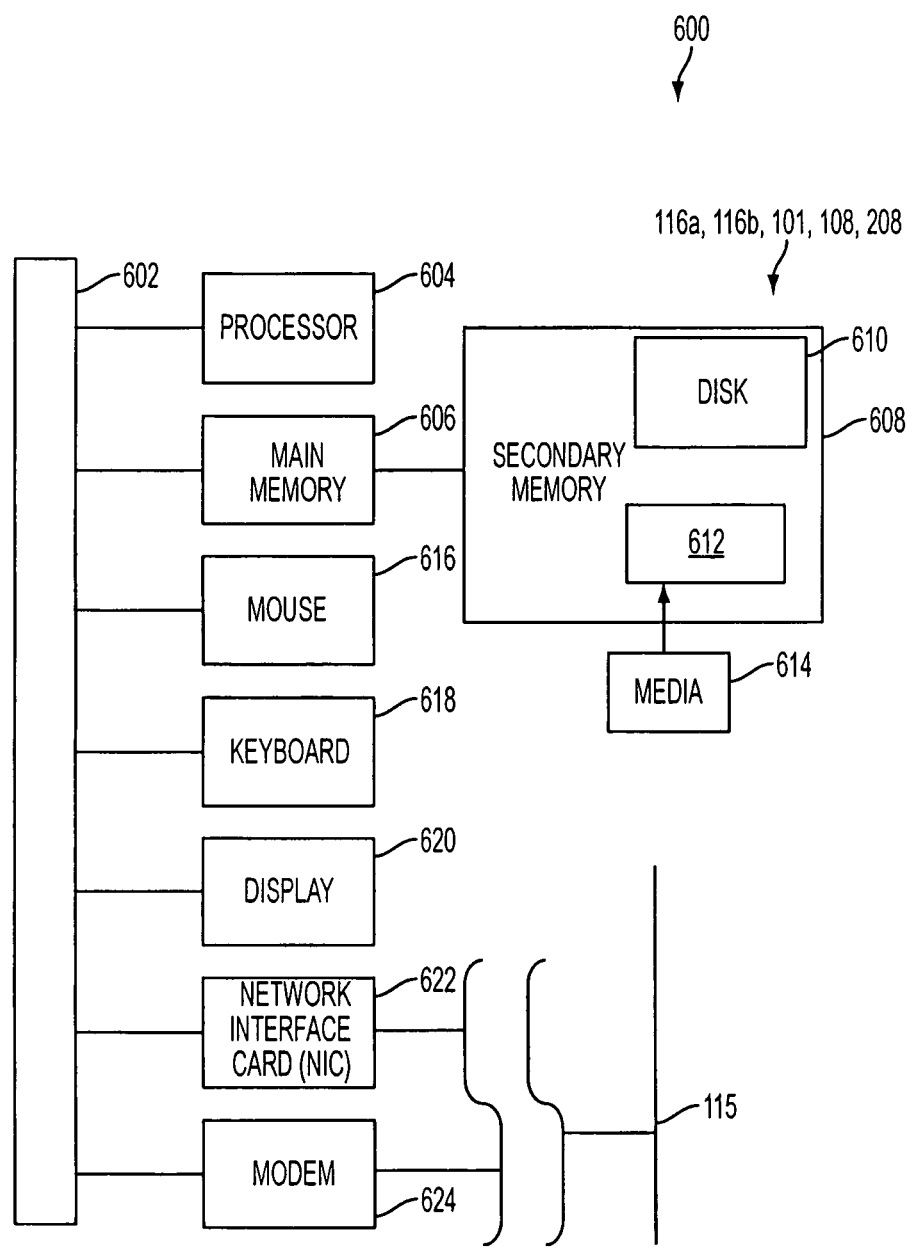
FIG. 3 is a schematic representation of a computer system on which the invention may be implemented.

FIG. 3 depicts an exemplary computer system that may be used in implementing an exemplary embodiment of the present invention. Specifically, FIG. 3 depicts an exemplary embodiment of a computer system 600 that may be used in computing devices such as, e.g., but not limited to, client or server devices including devices 116*a*, 116*b*, 101, 108, 208, etc. according to an exemplary embodiment of the present invention. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 600 is shown in FIG. 3, depicting an exemplary embodiment of a block diagram of an exemplary computer system useful for implementing the present invention. Specifically, FIG. 3 illustrates an example computer 600, which may be, e.g., (but not limited to) a personal computer (PC) system running an operating system. The invention may be implemented on any appropriate computer system running any appropriate operating system.

The computer system 600 may include one or more processors, such as, e.g., but not limited to, processor(s) 604. The processor(s) 604 may be connected to a communication infrastructure 602 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 600 may include a display interface 602 that may forward, e.g., but not limited to, graphics, text, and other data, etc., from the communication infrastructure 602 (or from a frame buffer, etc., not shown) for display on the display unit 620.

The computer system 600 may also include, e.g., but may not be limited to, a main memory 606, random access memory (RAM), and a secondary memory 608 etc. The secondary memory 608 may include, for example, (but not limited to) a hard disk drive 610 and/or a removable storage drive 612, representing a floppy diskette drive, a magnetic tape drive, an optical disk drive, a compact disk drive CD-ROM, etc. The removable storage drive 612 may, e.g., but not limited to, read from and/or write to a removable storage unit 614 in a well known manner. Removable storage unit 614, also called a program storage device or a computer program product, may represent, e.g., but not limited to, a floppy disk, magnetic tape, optical disk, compact disk, etc. which may be read from and written to by removable storage drive 614. As will be appreciated, the removable storage unit 614 may include a computer usable storage medium having stored therein computer software and/or data.

In alternative exemplary embodiments, secondary memory 608 may include other similar devices for allowing computer programs or other instructions to be loaded into computer system 600. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 614 and interfaces, which may allow software and data to be transferred from the removable storage unit 614 to computer system 600.

Computer 600 may also include an input device such as, e.g., (but not limited to) a mouse 616 or other pointing device such as a digitizer, and a keyboard 618 or other data entry device (none of which are labeled).

Computer 600 may also include output devices, such as, e.g., (but not limited to) display 620. Computer 600 may include input/output (I/O) devices such as, e.g., (but not limited to) communications interface 624. These devices may include, e.g., but not limited to, a modem. Communications interface 624 may allow software and data to be transferred between computer system 600 and external devices.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the data entry and search operations herein. An apparatus may be specially constructed for the desired purposes, or it may comprise a general purpose device selectively activated or reconfigured by a program stored in the device.

While the invention has been described in terms of preferred embodiments, those skilled in the art will recognize that the invention can be practiced with modification within the spirit and scope of the appended claims.

The invention claimed is:

1. A method executed by a computer system comprised of a non-transitory data storage device for storing a plurality of actual data values received from a location external to the system in a database organized as a hierarchical tree structure of datablocks comprising the steps of:
   creating a datablock that is part of the hierarchical tree structure of datablocks;
   assigning a plurality of pre-determined dimensions to the created datablock, where each dimension is associated with at least one of the actual data values to be stored and has a corresponding associated range test;
   assigning for each of the corresponding range tests a maximum and minimum parameter value for its corresponding dimension, where the maximum and minimum values serve as sufficient information for the corresponding range test to determine if a particular one of the actual data values of the corresponding dimension lies within a predetermined range defined by the maximum and minimum values;
   determining a datablock by executing a program using the assigned parameter values that determines the corresponding range test in order to determine if at least one of the actual data values received from a location external to the storage system to be stored in the database lies within the range of the corresponding dimension associated with the determined datablock; and
   executing a program to store in the determined datablock either the received data values that meet the range test or a pointer to a memory location where the data values that meet the range test are stored.

2. A computer system comprised of a non-transitory data storage device for storing a plurality of actual data values received from a location external to the system in a database organized as a hierarchical tree structure of datablocks, the system adapted to
- create a datablock that is part of the hierarchical tree structure of datablocks;
- assign a plurality of pre-determined dimensions to the created datablock, where each dimension is associated with at least one of the actual data values to be stored and has a corresponding associated range test;
- assign for each of the corresponding range tests a maximum and minimum parameter value for its corresponding dimension, where the maximum and minimum values serve as sufficient information for the corresponding range test to determine if a particular one of the actual data values of a corresponding dimension lies within a predetermined range defined by the maximum and minimum values;
- determine a datablock by executing a program using the assigned parameter values that determines the corresponding range test in order to determine if at least one of the actual data values received from a location external to the storage system to be stored in the database lies within the range of the corresponding dimension associated with the determined datablock; and
- execute a program to store in the determined datablock either the received data values that meet the range test or a pointer to a memory location where the data values that meet the range test are stored.

3. A non transitory data storage device comprised of data, that when executed by a computer system comprised of a non-transitory data storage device for storing a plurality of actual data values received from a location external to the system in a database organized as a hierarchical tree structure of datablocks, causes the system to:
- create a datablock that is part of the hierarchical tree structure of datablocks;
- assign a plurality of pre-determined dimensions to the created datablock, where each dimension is associated with at least one of the actual data values to be stored and has an associated range test;
- assign for each of the corresponding range tests a maximum and minimum parameter value for its corresponding dimension, where the maximum and minimum values serve as sufficient information for the associated range test to determine if a particular one of the actual data values of a corresponding dimension lies within a predetermined range defined by the maximum and minimum values;
- determine a datablock by executing a program using the assigned parameter values that determines the associated range test in order to determine if at least one of the actual data values received from a location external to the storage system to be stored in the database lies within the range of the corresponding dimension associated with the determined datablock; and
- execute a program to store in the determined datablock either the received data values that meet the range test or a pointer to a memory location where the data values that meet the range test is stored.

* * * * *